(12) United States Patent
Nakano et al.

(10) Patent No.: US 6,363,720 B1
(45) Date of Patent: Apr. 2, 2002

(54) MASTER CYLINDER FOR AUTOMOTIVE VEHICLE

(75) Inventors: Toshihiro Nakano, Chiryu; Hideaki Iijima, Kariya; Akimoto Okada, Anjo, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/537,101

(22) Filed: Mar. 29, 2000

(30) Foreign Application Priority Data

Mar. 30, 1999 (JP) .......................... 11-090050

(51) Int. Cl.[7] .............................. B60T 11/16
(52) U.S. Cl. .............................. 60/575; 60/574
(58) Field of Search .................... 60/574, 575, 591, 60/593

(56) References Cited

U.S. PATENT DOCUMENTS

| | | | | |
|---|---|---|---|---|
| 2,244,562 A | * | 6/1941 | Loweke | 60/574 |
| 2,275,700 A | * | 3/1942 | Swift | 60/574 |
| 3,561,213 A | * | 2/1971 | Shiber | 60/575 |

FOREIGN PATENT DOCUMENTS

| | | | | |
|---|---|---|---|---|
| DE | 29 17 684 | | 8/1989 | |
| GB | 2 049 850 | | 12/1980 | |
| GB | 2 160 275 | | 12/1985 | |
| GB | 2 162 604 | | 2/1986 | |
| GB | 2284644 | | 6/1995 | |
| JP | 5-507666 | | 11/1993 | |
| JP | 7-156785 | | 6/1995 | |
| JP | 10-297463 | | 11/1998 | |
| WO | 98/00321 | * | 1/1998 | .................. 60/574 |

* cited by examiner

Primary Examiner—F. Daniel Lopez
(74) Attorney, Agent, or Firm—Burns, Doane, Swecker & Mathis, LLP

(57) ABSTRACT

A master cylinder having variable input/output characteristics includes a cylinder body in which is formed a cylinder bore and a piston fitted in the cylinder bore and movable upon brake operation. The piston is divided into a front portion and a rear portion, with a pressure chamber being defined at the front side of the front portion and an auxiliary chamber being defined at the rear side of the front portion. The auxiliary pressure chamber is located at the same position as the rear portion of the piston. A first changeover valve is provided between the auxiliary pressure chamber and the pressure chamber to establish and interrupt fluid communication between the auxiliary pressure chamber and the pressure chamber.

17 Claims, 3 Drawing Sheets

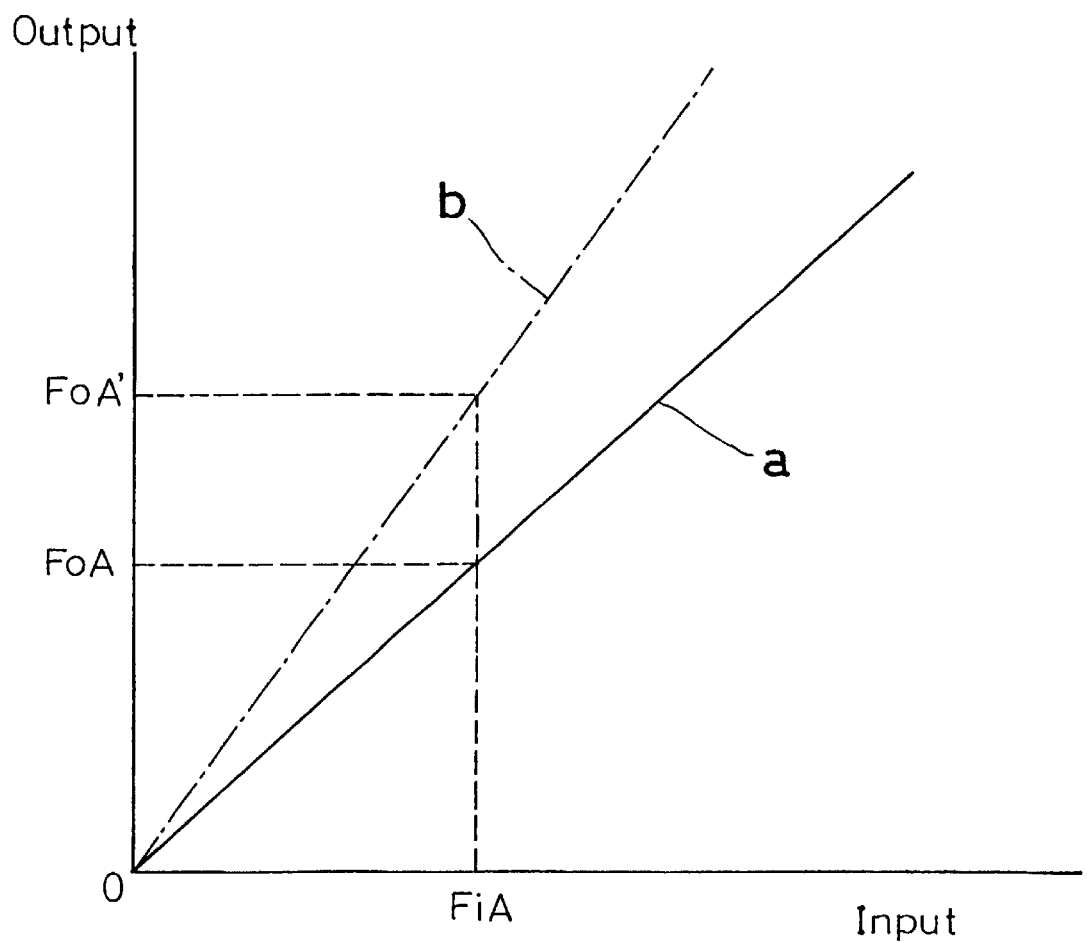

MASTER CYLINDER FOR AUTOMOTIVE VEHICLE

This application is based on and claims priority under 35 U.S.C. § 119 with respect to Japanese Application No. 11(1999)-90050 filed on Mar. 30, 1999, the entire content of which is incorporated herein by reference.

FIELD OF THE INVENTION

The present invention generally relates to vehicle braking devices or clutch devices. More particularly, the present invention pertains to a master cylinder for use in association with a braking device or a clutch device of an automotive vehicle.

BACKGROUND OF THE INVENTION

Japanese Patent Laid-Open Publication No. Hei. 10-297463 published in 1998 without examination describes a master cylinder that includes a cylinder body in which is formed a cylinder bore, and a piston fitted in the cylinder bore for back and forth movement. The piston defines a pressure chamber in the cylinder bore at the front side of the piston. The piston is configured to be of a fixed diameter and so the input/output characteristics of the master cylinder is constant or remains unchanged.

However, recently, from the view point of safety during vehicle driving or cruising, it is desirable that the brake system of an automotive vehicle be capable of being controlled in various high precision ways. There is thus a need for a master cylinder having varied input/output characteristics.

SUMMARY OF THE INVENTION

According to one aspect of the invention, a master cylinder is designed to provide variable input/output characteristics. The master cylinder includes a body in which is formed a bore, and a piston fitted in the cylinder bore and movable upon brake operation. The piston is divided into a front portion and a rear portion, with a pressure chamber being defined at the front side of the front portion and an auxiliary chamber being defined at the rear side of the front portion. The auxiliary pressure chamber is located at the same position as the rear portion of the piston. A first changeover valve is provided between the auxiliary pressure chamber and the pressure chamber to establish and interrupt fluid communication between the auxiliary pressure chamber and the pressure chamber.

Preferably, the front portion of the piston is larger in diameter than the rear portion of the piston so that the master cylinder provides a larger output when the auxiliary pressure chamber is in fluid communication with the pressure chamber than when the auxiliary pressure chamber is out of fluid communication with the pressure chamber subject to the same inputs to the master cylinder. Also, the front portion of the piston is movable relative to the rear portion of the piston.

A pressure increasing mechanism is provided for increasing the pressure in the auxiliary pressure chamber. The pressure increasing mechanism advantageously increases the pressure of the brake fluid in the auxiliary pressure chamber, which causes the piston to move in the frontward direction, thereby increasing the pressure of the brake fluid in the pressure chamber. A second changeover valve is provided for establishing and interrupting fluid communication between the auxiliary pressure chamber and a reservoir supplying brake fluid to the auxiliary pressure chamber. The pressure increasing mechanism, the first changeover valve, and the second changeover valve are preferably under the control of a common control device. Further, the piston is provided with a communication passage thorough which the pressure chamber is in fluid communication with a main reservoir for supplying brake fluid to the pressure chamber. The communication passage is closed by a seal cup to interrupt fluid communication between the pressure chamber and the main reservoir when the piston moves through a distance relative to the cylinder body.

According to another aspect of the invention, a master cylinder includes a cylinder body in which is defined a bore, and a piston in the bore that is movable in response to brake operation. The piston includes a front portion and a rear portion, with the front portion being movable relative to the rear portion. A pressure chamber is defined within the bore on the front side of the front portion of the piston and an auxiliary pressure chamber is located at the rear side of the front portion of the piston. A communication passage connects the auxiliary pressure chamber to the pressure chamber.

In accordance with another aspect of the invention, a master cylinder includes a cylinder body possessing a bore and a piston positioned in the bore for movement within the bore. The piston includes a front portion and a rear portion, with the front portion being movable relative to the rear portion and having a larger diameter than the rear portion. A pressure chamber is located at the front side of the front portion of the piston and an auxiliary pressure chamber is located at the rear side of the front portion of the piston.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG. 3 is a graph illustrating the variable input/output characteristics of the master cylinder shown in FIG. 1.

DETAILED DESCRIPTION OF THE PRESENT INVENTION

Figure 1:
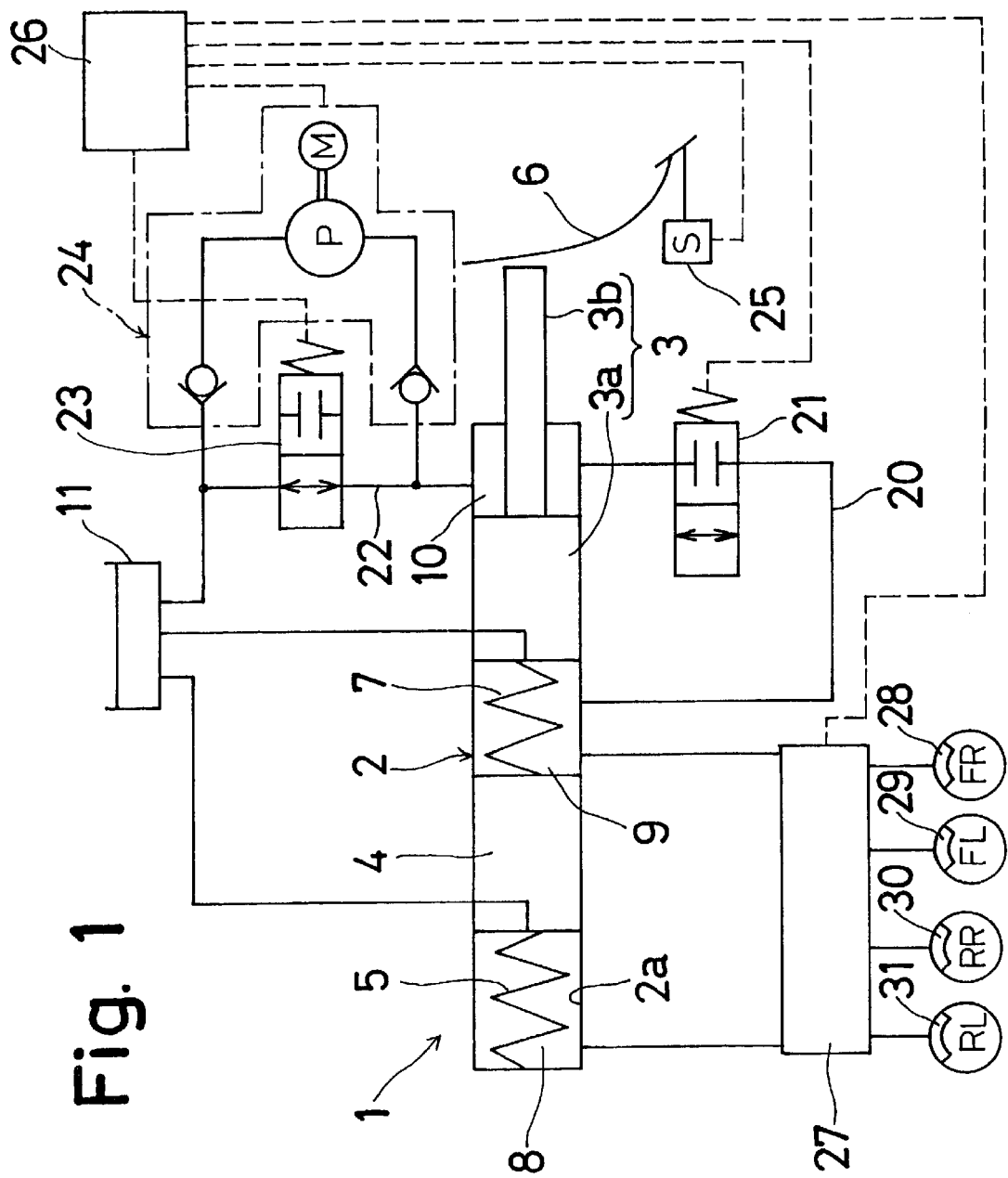
FIG. 1 is a schematic diagram of a brake system incorporating a master cylinder in accordance with an embodiment of the present invention.
Figure 2:
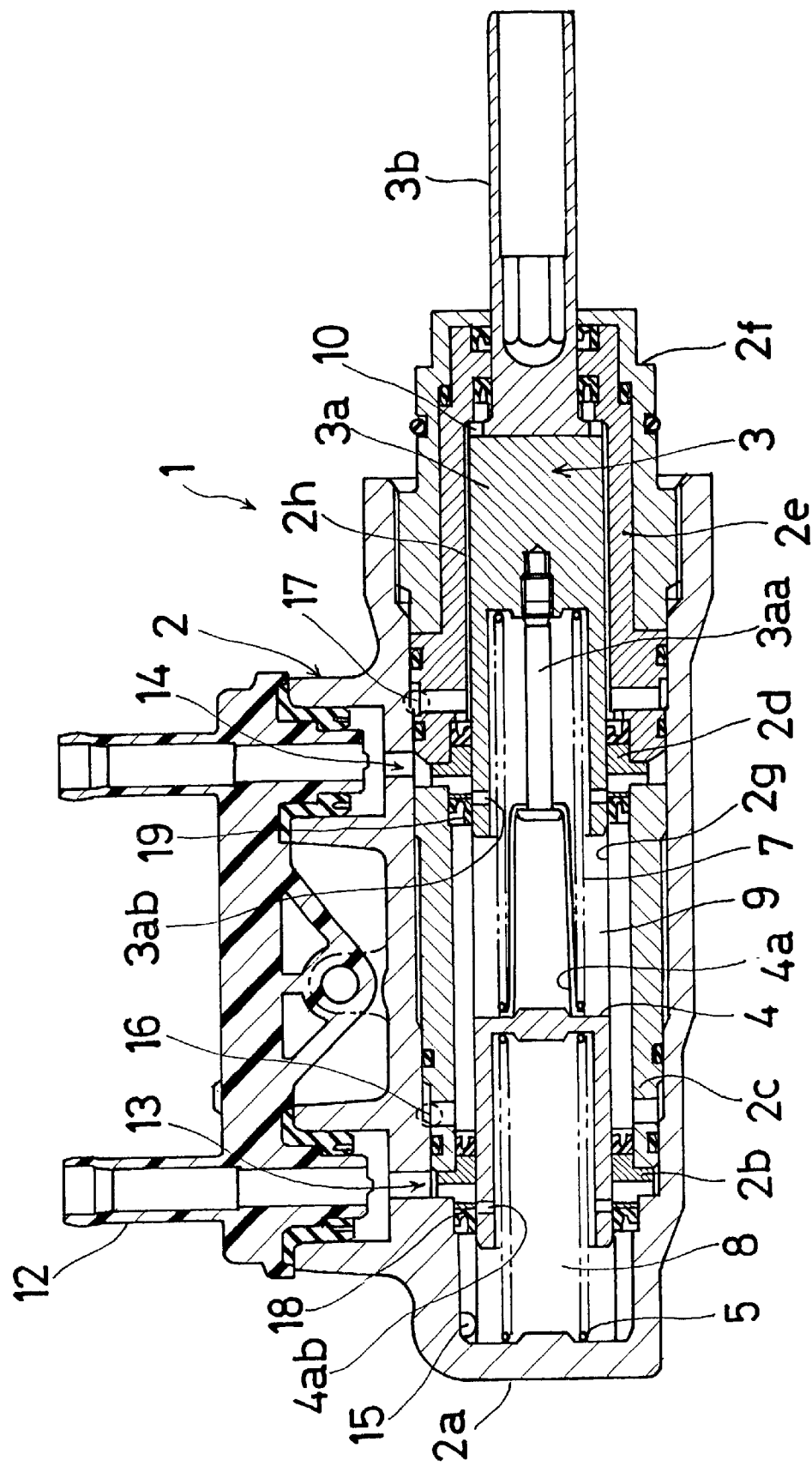
FIG. 2 is a vertical cross-sectional view of the master cylinder shown in FIG. 1.

Referring to FIGS. 1 and 2, the master cylinder 1 according to the present invention includes a cylinder body 2, a first piston 3, and a second piston 4. The cylinder body 2 has a main portion or cylinder body 2a in which a blind bore or cylinder bore 2g is formed. The rear end of the cylinder bore 2g (i.e., the right side of the cylinder bore in FIGS. 1 and 2) is open and the front end of the cylinder bore 2g (i.e., the left side of the cylinder bore in FIGS. 1 and 2) is closed. Positioned within the cylinder bore 2g are a first guide member 2d, a second guide member 2b, a first sleeve 2c, a second sleeve 2e, and a plug 2f. The first piston 3 is fitted in the rear portion of the cylinder bore 2g and the second piston 4 is fitted in front portion of the cylinder bore 2g. The first and second pistons 3, 4 are slidably fitted in the bore 2g for sliding movement in the axial direction (i.e., the right and left direction in FIGS. 1 and 2).

The second piston 4 possesses a bottom walled configuration whose front end portion (i.e., the left side in FIGS. 1 and 2) is open. A spring 5 is interposed between the closed wall of the cylinder bore 2g and the closed wall of the second piston 4 to urge or bias the second piston 4 in the rearward direction.

In a preferred form of the invention, the first piston 3 possess a separated or two-piece configuration having a front portion 3a and a rear portion 3b. The front portion 3a possesses a bottom walled configuration having an open front end and a closed rear end. The rear portion 3b possesses a substantially cylindrical shape, is located at the rear side of the front portion 3a, and is co-axially aligned with the front portion 3a. The front portion 3a of the first piston 3 is movable in the rearward and frontward directions relative to the rear portion 3b of the first piston 3.

The front portion 3a possesses a radius or outer diameter that is slightly larger than the radius or outer diameter of the rear portion 3b. The rear portion 3b of the first piston 3 extends outwardly thorough the rear opening of the cylinder body 2 and is coupled to a brake pedal 6 in an interlocking manner.

A rear end portion of a rod 3aa which extends in the axial direction (i.e., horizontal direction in FIGS. 1 and 2) is snugly fitted in or fixed to the bottom wall of the front portion 3a of the first piston 3. A bottom walled stopper 4a is provided at the rear side portion of the second piston 4. The front end of the bottom walled stopper 4a is open. The rod 3aa extends or passes through the bottom wall of the stopper 4a. An outer flange is formed at the front end of the stopper 4a and a spring 7 is interposed between the outer flange of the stopper 4a and the bottom wall of the front portion 3a of the first piston 3.

The spring 7 directly urges or biases the front portion 3a of the first piston 3 in the rearward direction and indirectly urges or biases the rear portion 3b of the first piston 3 in the rearward direction via the front portion 3a. The spring 7 thus urges or biases the first piston 3 as a whole in the rearward direction. Engaging the outer flange at the front portion of the rod 3aa with the bottom wall of the stopper 4a determines a retracted position of the front portion 3a of the first piston 3 relative to the second piston 4 and the cylinder body 2, which leads to a determination of a retracted position of the first piston 3 relative to the cylinder body 2.

A first pressure chamber 9 is defined at the frontward portion of the first piston 3 and is positioned between the rear end of the second piston 4 and the front end of the first piston 3. In addition, a second pressure chamber 8 is defined at the frontward portion of the second piston 4 and is positioned between the front end of the second piston 4 and the bottom wall of the cylinder bore 2g of the cylinder body 2. An auxiliary pressure chamber 10 is formed in the cylinder bore 2g when the rear portion 3b of the first piston 3 is located at the rear portion of the front portion 3a of the first piston 3.

The cylinder body 2 is formed with two ports 13, 14. The port 14 is in fluid communication with the passage of a union element or connector piece 12 so as to supply brake fluid as an operation fluid into the first pressure chamber 10 from a reservoir unit 11. The reservoir unit 11 includes a main reservoir and an auxiliary reservoir. The port 13 supplies brake fluid into the second pressure chamber 8 by way of another passage in the union element or connector piece 12.

A radially extending fluid communication passage 3ab is formed in the front end portion of the first piston 3 to establish fluid communication between an inner space of the front portion 3a and an outer space of the piston 3. The first pressure chamber 9 is set to be in in fluid communication with the reservoir unit 11 by way of the inner space of the front portion 3a, the communication passage 3ab, and the port 14.

A radially extending fluid communication passage 4ab is also formed in the front end portion of the second piston 4 to establish fluid communication between an inner space of the second piston 4 and an outer space of the second piston 4. The second pressure chamber 8 is set to be in fluid communication with the reservoir unit 11 by way of the inner space of the second piston 4, the communication passage 4ab and the port 13.

The cylinder body 2 is formed with several outlet ports 15, 16, 17. The outlet port 15 establishes fluid communication between the second pressure chamber 8 and wheel brakes 30, 31 by way of an actuator 27 which acts as a hydraulic pressure control device. The outlet port 16 establishes fluid communication between the first pressure chamber 9 and wheel brakes 28, 29 by way of the actuator 27. The wheel brakes 28, 29, 30, 31 constitute a hydraulic pressure operation device. The outlet port 17 establishes fluid communication between the auxiliary pressure chamber 10 and the reservoir unit 11.

A rubber-made seal cup 19 is provided between the inner surface of the cylinder bore 2g of the cylinder body 2 and the first piston 3, while another rubber-made seal cup 18 is provided between the inner surface of the cylinder bore 2g of the cylinder bore 2 and the second piston 4. The inner surface and the outer surface of the rubber-made seal cup 19 are in fluid-tight contact with the outer surface of the first piston 3 and the inner surface of the cylinder bore 2g of the cylinder body 2. The inner surface and outer surface of the rubber-made seal cup 18 are in fluid-tight contact with the outer surface of the second piston 4 and the inner surface of the cylinder bore 2g of the cylinder body 2.

The seal cup 19 closes the communication passage 3ab when the first piston 3 moves through a distance relative to the cylinder body 2, thus interrupting fluid communication between the first pressure chamber 9 and the reservoir unit 11. Likewise, the seal cup 18 closes the communication passage 4ab when the second piston 4 moves through a distance relative to the cylinder body 2, thus interrupting fluid communication between the second pressure chamber 8 and the reservoir unit 11.

The auxiliary pressure chamber 10 is in fluid communication with the first pressure chamber 9 by way of the outlet port 17 or another port provided in the cylinder body 2. A normally closed electromagnetic valve or first changeover valve 21 is disposed in the hydraulic communication passage 20. The normally closed electromagnetic valve or first changeover valve 21 establishes and interrupts fluid communication between the first pressure chamber 9 and the auxiliary pressure chamber 10.

The auxiliary pressure chamber 10 is set to be in fluid communication with the reservoir unit 11 by way of a communication passage 22. To establish and interrupt this fluid communication, a normally opened electromagnetic valve 23 serving as a second changeover valve is disposed in the hydraulic communication passage 22.

A motor driven pump device 24 is provided in the hydraulic communication passage 22. The motor driven pump device 24 acts as a pressure increasing device and is positioned in parallel to the electromagnetic valve 23. When the pump device 24 is turned on, the pump device 24 sucks brake fluid from the reservoir unit 11, pressurizes the brake fluid, and supplies the resulting brake fluid or brake fluid under pressure to the auxiliary pressure chamber 10.

The brake pedal 6 is operatively associated with a pedal stroke sensor 25 which determines a pedal stroke or a depression displacement when the brake pedal 6 is depressed. The electromagnetic valves 21, 23, the pump device 24, the pedal stroke sensor 25, and the actuator 27 are electrically coupled or wired to an electronic control device 24 which, as is well known, may be in the form of a microcomputer including a microprocessor or CPU.

The actuator 27 has built-in or inner-provided electromagnetic valves, pump units, and other elements and is operated for effecting an antilock braking system (ABS), traction control (TRC), and braking steering control. Such an actuator 27 per se is well known in structure and operation and so a detailed discussion is not provided here.

The following is a detailed explanation of the operation of the master cylinder having the structure as previously explained. While the master cylinder 1 is in its initial state or condition as shown in FIGS. 1 and 2, the first piston 3 and the second piston 4 are at rest and are therefore in the respective retracted positions relative to the cylinder body 2. Under this condition, as mentioned above, the first pressure chamber 9, the second pressure chamber 8, and the auxiliary pressure chamber 10 are in fluid communication with the reservoir unit 11.

Under the initial condition of the master cylinder 1 as depicted in FIGS. 1 and 2, when the brake pedal 6 is depressed or is applied with a depression force from a driver, the rear portion 3b of the first piston 3 is urged forwardly, thus causing frontward movement of the first piston 3. At this time, the auxiliary pressure chamber 10 is in fluid communication with the reservoir unit 11, and the supply of brake fluid from the reservoir unit 11 to the auxiliary pressure chamber 10 continues upon frontward movement of the first piston 3. Frontward movement of the piston 3 is thus not inhibited.

Together with the frontward movement of the rear portion 3b of the first piston 3, the front portion 3a which is in abutment at its rear end with the front end of the rear portion 3b, also moves in the frontward direction relative to the cylinder body 2. That is to say, a unitary frontward movement of the rear portion 3b and the front portion 3a, which together constitute the first piston 3, occurs against the biasing or urging force of the spring 7, and the communication passage 3ab formed un the front portion 3a of the first piston 3 is closed by the seal cup 19. This interrupts fluid communication between the first pressure chamber 9 and the reservoir unit 11, thereby increasing the pressure of the brake fluid in the first pressure chamber 9.

The resultant pressure increase of the brake fluid in the first pressure chamber 9 makes the second piston 4 move in the frontward direction, thus causing the seal cup 18 to close the communication passage 4b of the second piston 4 during this frontward motion. As a result, fluid communication between the second pressure chamber 8 and the reservoir unit 11 is interrupted, thereby increasing the pressure of the brake fluid in the second pressure chamber 8.

The pressure increase of the brake fluid in the respective pressure chambers 8, 9 causes the brake fluid under pressure or the pressurized brake fluid to be supplied to the wheel brakes 28, 29, 30, 31 by way of the actuator 27. The wheel brakes 28, 29, 30, 31 which are supplied with the resultant brake fluid apply braking forces to the respective wheels FR, FL, RR, RL.

When, for example, the brake pedal 6 is depressed suddenly for brake operation, the electronic control device 26 recognizes that the resultant depression speed of the brake pedal 6 reaches a threshold value or predetermined value. Then, the electronic control device 26 judges that such a depression indicates a sudden brake operation and brings the electromagnetic valves 21, 23 into activation for establishing fluid communication between the auxiliary pressure chamber 10 and the first pressure chamber 9 and interrupting the fluid communication between the auxiliary pressure chamber 10 and the reservoir unit 11.

Thus, under normal brake operation, the piston effective diameter and area are those of the one portion 3a of the piston 3, but under sudden brake operation the piston effective diameter and area are switched to those of the other portion 3b of the piston 3.

The rear portion 3b of the first piston 3 is smaller in diameter than the front portion 3a, which causes the input/output characteristics of the master cylinder 1, as shown in FIG. 3, to shift from a real or solid line 'a' resulting from or associated with the effective area of the front portion 3a to a phantom or dotted line 'b' resulting from or associated with the piston effective diameter of the rear portion 3b.

In other words, assuming that the same depression force having a magnitude FiA is applied to the brake pedal 6 in both the normal and sudden brake operations, the output (pressure) under sudden braking operations becomes FoA' which is larger than the output (pressure) under normal braking operations which is of a magnitude FoA. This means that the braking forces generated at the respective wheel brakes 28, 29, 30, 31 are increased, thereby compensating or supplementing an insufficient depression force when a sudden brake operation is effected.

During sudden brake operations, the driving operation of the pump device 24 is available. In this case, in addition to the foregoing operation, the pump device 24 sucks brake fluid from the reservoir unit 11 and supplies the brake fluid under pressure to the first pressure chamber 9 by way of the auxiliary pressure chamber 10.

The pressure of the brake fluid in the first pressure chamber 9 is further increased and the pressure of the brake fluid in the second pressure chamber 8 is also increased, thereby increasing the braking forces generated at the wheel brakes 28, 29, 30, 31. Thus, larger braking forces are obtained in comparison with the foregoing operation.

When the brake fluid is supplied to the auxiliary pressure chamber 10 by the actuation of the pump device 24 under sudden brake operation, the brake fluid supplied to the auxiliary pressure chamber 10 further flows into the first pressure chamber 9. The front portion 3a and the rear portion 3b of the piston 3 become separated due to forward movement of the front portion 3a of the piston 3 relative to the rear portion 3b. The pressure in the auxiliary pressure chamber 10 acts against the rear portion 3b of the piston 3 and so the brake pedal 6 provides a good brake feeling to the driver.

If, for example, the electronic control device 26 detects an over-steered condition of the vehicle when the vehicle turns to the left, even though the driver does not depress the brake pedal 6, well-known over-steering control is initiated in such a manner that brake fluid is supplied to the outer front wheel or the right-front wheel FR.

While the actuator 27 continues to operate the brake steering control, the electronic control device 26 begins to operate a pre-stage pressure application operation wherein the electromagnetic valve 23 and the pump device 24 are brought into activation. That is, the master cylinder 1 is brought into operation even though no depression force is applied to the brake pedal 6.

Activating the electromagnetic valve 23 interrupts fluid communication between the auxiliary pressure chamber 10 and the reservoir unit 11. Then, the pump device 24 sucks brake fluid from the reservoir unit 11 and supplies brake fluid, after pressurizing the brake fluid, to the auxiliary pressure chamber 10. Thus, the pressure of the brake fluid in the auxiliary pressure chamber 10 is increased, thereby moving the front portion 3a of the first piston 3 in the frontward direction relative to the rear portion 3b of the first piston 3 with the current position of the rear portion 3b remaining unchanged.

This frontward movement of the front portion 3a of the first piston 3 causes the communication passage 3ab formed in the front portion 3a of the first piston 3 to be closed by the seal cup 19, thus interrupting fluid communication between the first pressure chamber 9 and the reservoir unit 11, and increasing the pressure of the brake fluid in the first pressure chamber 9. The resulting pressure of the brake fluid in the first pressure chamber 9 moves the second piston 4 in the frontward direction and so the communication passage 4b formed in the second piston 4 is closed by the seal cup 18. This interrupts fluid communication between the second pressure chamber 8 and the reservoir unit 11. Thus, the pressure of the brake fluid in the second pressure chamber 8 is increased.

The brake fluid pressurized by the pump device 24 is fed from the master cylinder 1 to a pump unit provided in the actuator 27, and the pump unit in the actuator sucks the brake fluid and supplies the brake fluid to the wheel cylinder 28 of the right-front wheel FR, thereby applying a brake force to right-front wheel FR. In more detail, upon initiation of brake steering control, sucking the brake fluid of the pump unit in the actuator 27 which is pressurized by the operation of the pump device 24 allows the pump unit to operate more smoothly in sucking and discharging. This leads to a smoother increase in the pressure of the brake fluid in the turning outer front wheel brake. A temporal pressure increase of the brake fluid to be supplied to the wheel brake of the turning outer front wheel brake can avoid oversteering condition of the vehicle.

While the brake steering control is being made, the pre-stage pressure increase operation is performed by automatic operation of the master cylinder 1. It is to be noted that using a higher powered pump device 24 can eliminate the need for the pump unit in the actuator 27.

If the electronic control device 26 recognizes that the brake steering control is released, the electronic control device 26 causes the electromagnetic valve 23 and the pump unit 24 to become inactive. Then, the auxiliary pressure chamber 10 is communicated with the reservoir unit 11, which allows the springs 5, 7 to return the first piston 3 and the second piston 4 to their respective initial positions, thereby decreasing the pressure of the brake fluid in each of the first pressure chamber 9 and the second pressure chamber 8. Thus, the pre-stage pressure increase or pressure application operation is terminated.

While the pre-stage pressure increase operation is being made, the rear portion 3b of the first piston 3 remains in its initial position, which leads to the brake pedal 6 which is interlocked with the rear portion 3b of the first piston 3 also remaining at its initial position. Thus, during the pre-stage pressure increase operation, when the driver depresses the brake pedal 6, a brake feeling is provided to the driver which is similar to the brake feeling upon normal brake operation.

While the pre-stage pressure increase operation is being performed, if the driver feels the need to brake and thus depresses the brake pedal 6, due to the fact that the pressure of the brake fluid in the auxiliary pressure chamber 10 is increased, rearward pressure is applied to the rear portion 3b of the first piston 3 which gives a suitable reaction force to the driver, thereby providing a better brake feeling to the driver.

While the pre-stage pressure increase operation is being carried out, if the brake pedal 6 is depressed, the resultant frontward movement of the rear portion 3b further increases the pressure of the brake fluid in the auxiliary pressure chamber 10 which starts with a condition that the master cylinder 1 has issued the output as a result of the initiation of the pre-stage pressure increase operation. The pressure increase of the brake fluid in the auxiliary pressure chamber 10 causes the front portion 3a of the first piston 3 to move in the frontward direction, which results in a pressure increase of the brake fluid in each of the first pressure chamber 8 and the second pressure chamber 9. Thus, in comparison with the normal brake operation condition, outputting higher pressure output becomes possible from the master cylinder 1. It is to be noted that the pressure increasing rate of each of the auxiliary pressure chamber 10, the first pressure chamber 8, and the second pressure chamber 9 depends on the ratio of area defined by the diameter of the rear portion 3b to the area defined by the diameter of the front portion 3a.

As explained above in detail, in the master cylinder 1 in accordance with the present invention, the first piston 3 includes the first portion 3a of larger diameter and the second portion 3b of smaller diameter, which changes the effective area of the first piston 3 by activating the electromagnetic valves 21 and 23, thereby enabling adjustment or a variation in the input/output characteristics of the master cylinder 1. Thus, the present invention is capable of providing the master cylinder with variable input/output characteristics.

In addition, the structure which permits the fluid communication between the auxiliary pressure chamber 10 and the first pressure chamber 9 allows an increase of the pressure of the brake fluid in the second pressure chamber 8 as the pressure of the brake fluid in the first pressure chamber 9 increases. Further, providing the pump device 24 to the master cylinder 1 enables the master cylinder 1 to operate in an automatic operation mode.

The first piston 3 is divided into the front portion 3a and the rear portion 3b, and this allows the brake pedal 6 to remain its initial position when the automatic operation mode such as the pre-stage pressure increasing operation is effected, thereby enabling good brake feeling.

Also, setting the diameter of the front portion 3a of the first piston 3 larger than the diameter of the rear portion 3b of the first piston 3b makes it possible to establish input/output characteristics in which the output of the master cylinder 1 is increased while the input remains unchanged. Thus, the input/output characteristics can be varied to a suitable condition, for example a sudden brake operation.

While the master cylinder 1 is being in operation in its automatic brake operation mode, if the brake pedal 6 is depressed, the resultant reaction force to the brake pedal 6 becomes suitable, thereby being capable of providing good brake feeling.

The master cylinder 1 is formed as a plunger type master cylinder, which makes it possible to form the communication passage 2h in the inner surface of the cylinder bore 2g of the cylinder body 2 connecting the auxiliary pressure chamber 10 and the port 17. This thus simplifies the structure of the master cylinder 1.

In the above-described embodiment, although the illustrated master cylinder 1 is a tandem type master cylinder, the present invention can be applied to other types of master cylinders such as a single type master cylinder, while also effecting similar advantageous operations and effects.

In the present embodiment, although the automatic brake operation mode is established for pre-stage pressure operation, the automatic brake operation mode can be established for other controls such as automatic brake control during inter-vehicle distance control, while also effecting similar advantageous operations and effects.

As described above, the input/output characteristics varying mechanism of the master cylinder 1 is set to be turned on upon sudden brake operation. The input/output characteristics varying mechanism can also be turned on at any time it is desired to vary the input/output characteristics of the master cylinder such as under varying vehicle load conditions.

Although the auxiliary pressure chamber 10 is set to be in fluid communication with the first pressure chamber, this is not restrictive in nature and thus other modifications are possible with similar operations and effects as those described above. For example, fluid communication of the auxiliary pressure chamber 10 with the second pressure chamber 9 or both the first pressure chamber 8 and the second pressure chamber 9 is possible.

In the embodiment described above, the electromagnetic valve 21, the electromagnetic valve 23, and the pump device 24 are set to be turned on depending on the result of the pedal stroke sensor 25. However, the invention is not limited in this regard. Other modifications with similar operations and effects are possible. For example, instead of the pedal stroke sensor 25, a depression speed sensor which directly detects the depression speed of the brake pedal 6 upon depression thereof and a depression force sensor which detects the depression force of the brake pedal 6 in response thereto can be employed.

The master cylinder 1 described above is a plunger type master cylinder, but the invention is also applicable to other types of master cylinders such as center valve type master cylinders or conventional type master cylinders.

The principles, preferred embodiment and models of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the sprit of the present invention. Accordingly, it is expressly intended that all such variations, changes and equivalents which fall within the sprit and scope of the present invention as defined in the claims be embraced thereby.

What is claimed is:

1. A master cylinder comprising:
    a cylinder body in which is formed a cylinder bore;
    a piston positioned in the cylinder bore for back and forth movement, the piston including a front portion and a rear portion which possess different diameters, the front portion defining a pressure chamber at its front side and an auxiliary pressure chamber at its rear side in such a manner that the auxiliary pressure chamber is located at the same position as the rear portion of the piston, the piston being moved upon brake operation, the front portion of the piston being movable relative to the rear portion of the piston;
    a first changeover valve establishing and interrupting fluid communication between the pressure chamber and the auxiliary pressure chamber independent of movement of the piston; and
    a second changeover valve establishing and interrupting fluid communication between the auxiliary pressure chamber and a reservoir supplying brake fluid to the auxiliary pressure chamber independent of movement of the piston.

2. The master cylinder as set forth in claim 1, wherein the front portion of the piston has a larger diameter than the rear portion of the piston.

3. The master cylinder as set forth in claim 1, further comprising pressure increasing means for increasing the pressure in the auxiliary pressure chamber.

4. The master cylinder as set forth in claim 3, wherein the pressure increasing means, the first changeover valve, and the second changeover valve are operatively connected to and under the control of a common control device.

5. The master cylinder as set forth in claim 1, wherein the piston is provided with a communication passage through which the pressure chamber is in fluid communication with a main reservoir for supplying brake fluid to the pressure chamber, and including a seal cup for closing the communication passage to interrupt fluid communication between the pressure chamber and the main reservoir when the piston moves through a distance relative to the cylinder body.

6. A master cylinder comprising:
    a cylinder body in which is formed a bore;
    a piston positioned in the bore and movable in response to brake operation, the piston including a front portion and a rear portion, the front portion being movable relative to the rear portion;
    a pressure chamber defined within the bore at a front side of the front portion of the piston;
    an auxiliary pressure chamber defined within the bore at a rear side of the front portion of the piston;
    a communication passage connecting the pressure chamber to the auxiliary pressure chamber;
    a first changeover valve establishing and interrupting fluid communication between the pressure chamber and the auxiliary pressure chamber independent of movement of the piston; and
    a second changeover valve establishing and interrupting fluid communication between the auxiliary pressure chamber and a reservoir supplying brake fluid to the auxiliary pressure chamber independent of movement of the piston.

7. The master cylinder as set forth in claim 6, wherein said piston is a first piston, and including a second piston positioned in the bore at a front side of the first piston.

8. The master cylinder as set forth in claim 7, wherein the pressure chamber is located between said first piston and said second piston.

9. The master cylinder as set forth in claims 9, wherein the pressure chamber is a front pressure chamber, and including a second pressure chamber located at a front side of the second piston.

10. The master cylinder as set forth in claim 6, wherein the first changeover valve is disposed in the communication passage.

11. The master cylinder as set forth in claim 6, wherein the front portion of the piston has a larger diameter than the rear portion of the piston.

12. The master cylinder as set forth in claim 8, wherein the piston is provided with a communication passage for fluidly communicating the pressure chamber with a main reservoir for supplying brake fluid to the pressure chamber, and including a seal cup for closing the communication passage to interrupt fluid communication between the pressure chamber and the main reservoir when the piston moves through a distance relative to the cylinder body.

13. The master cylinder as set forth in claim 6, wherein the communication passage is a first communication passage, and including a second communication passage for connecting the auxiliary pressure chamber to a reservoir, and the second changeover valve is positioned in the second communication passage.

14. A master cylinder comprising:

a cylinder body in which is formed a bore;

a piston movably positioned within the bore for movement in response to brake operation, the piston including a front portion and a rear portion, the front portion of the piston being movable with respect to the rear portion of the piston, the front portion of the piston having a larger diameter than the rear portion;

a pressure chamber defined within the bore at a front side of the front portion of the piston;

an auxiliary pressure chamber located at a rear side of the front portion of the piston;

a first changeover valve establishing and interrupting fluid communication between the pressure chamber and the auxiliary pressure chamber independent of movement of the piston; and a second changeover valve establishing and interrupting fluid communication between the auxiliary pressure chamber and a reservoir supplying brake fluid to the auxiliary pressure chamber independent of movement of the piston.

15. The master cylinder as set forth in claim 14, wherein said piston is a first piston, and including a second piston positioned in the bore at a front side of the first piston.

16. The master cylinder as set forth in claim 15, wherein the pressure chamber is located between said first piston and said second piston.

17. The master cylinder as set forth in claim 14, including a communication passage connecting the auxiliary pressure chamber to the pressure chamber, the first changeover valve being disposed in the communication passage.

* * * * *